No. 683,432. Patented Oct. 1, 1901.
B. BERNSTEIN.
APPARATUS FOR LIGHTING VEHICLES BY ELECTRICITY.
(Application filed Nov. 28, 1900.)
(No Model.) 4 Sheets—Sheet 1.

No. 683,432. Patented Oct. 1, 1901.
B. BERNSTEIN.
APPARATUS FOR LIGHTING VEHICLES BY ELECTRICITY.
(Application filed Nov. 28, 1900.)
(No Model.) 4 Sheets—Sheet 2.
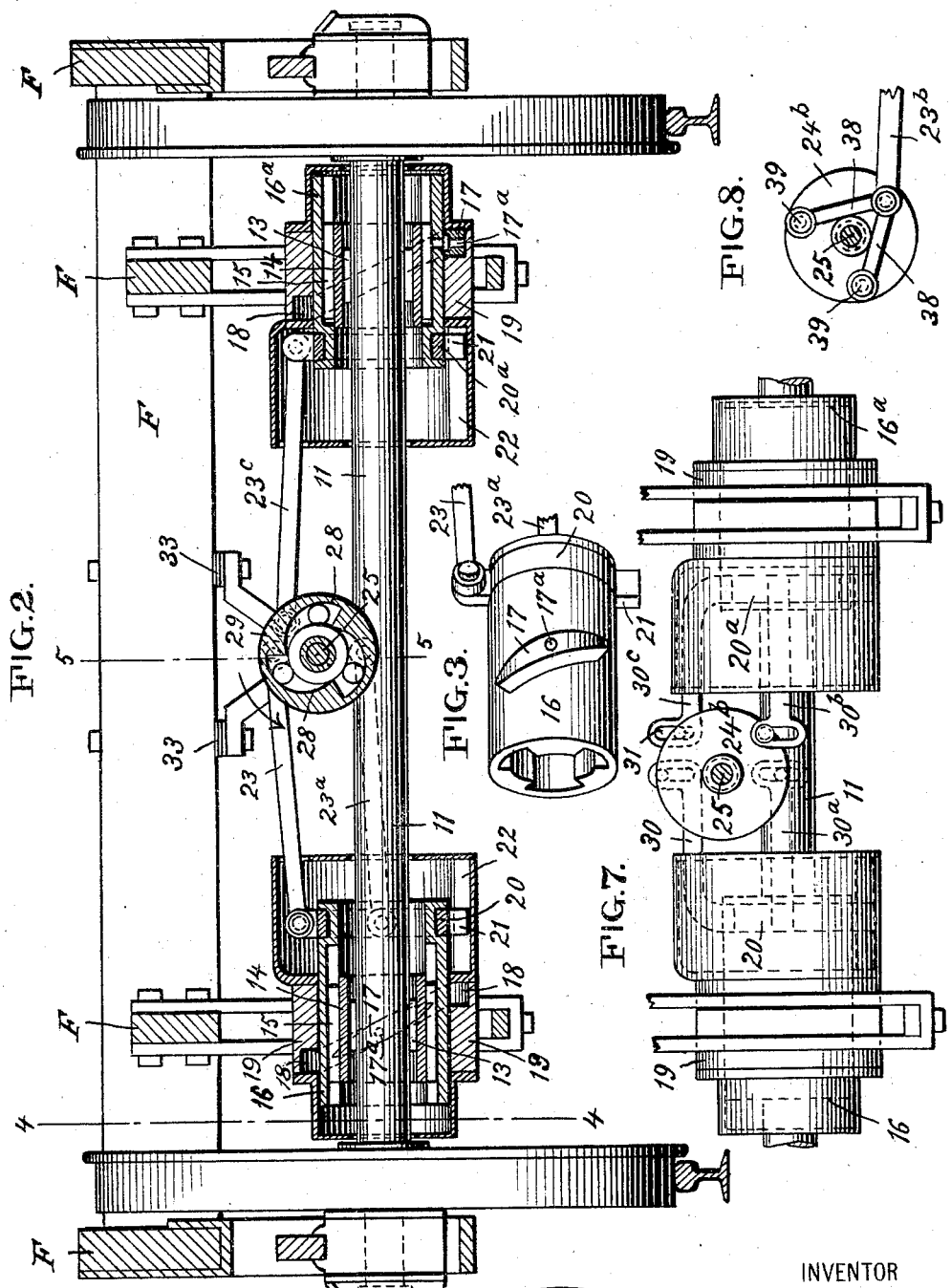
WITNESSES:
INVENTOR
Benny Bernstein
BY
Knight Bros
ATTORNEYS No. 683,432. Patented Oct. 1, 1901.
B. BERNSTEIN.
APPARATUS FOR LIGHTING VEHICLES BY ELECTRICITY.
(Application filed Nov. 28, 1900.)
(No Model.) 4 Sheets—Sheet 3.
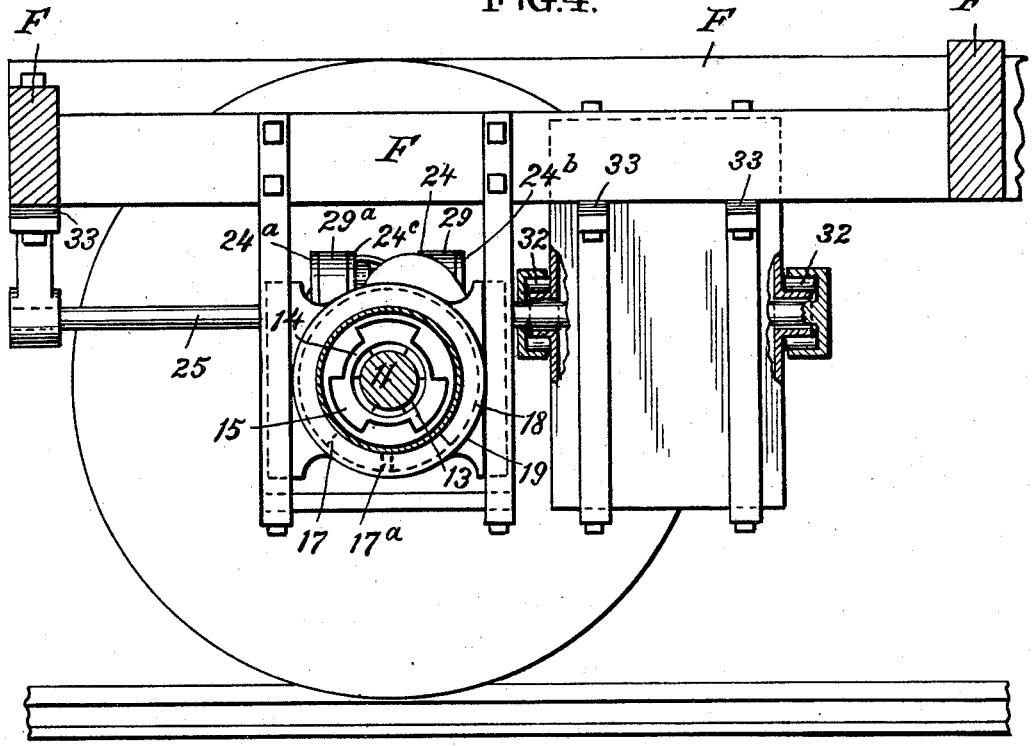
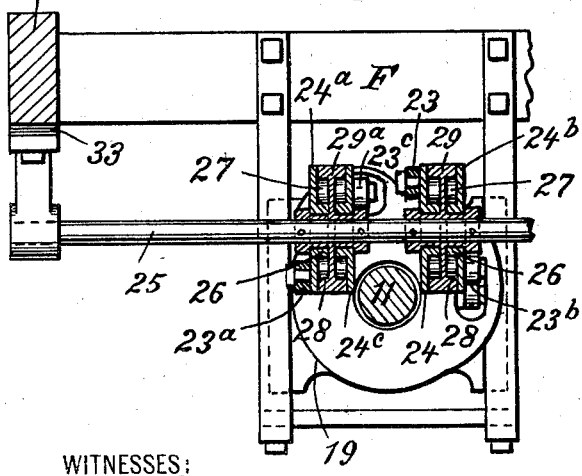
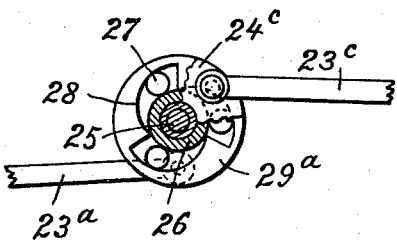
WITNESSES:
INVENTOR
Benny Bernstein
BY
ATTORNEYS No. 683,432. Patented Oct. 1, 1901.
B. BERNSTEIN.
APPARATUS FOR LIGHTING VEHICLES BY ELECTRICITY.
(Application filed Nov. 28, 1900.)

(No Model.) 4 Sheets—Sheet 4.

WITNESSES INVENTOR
Bonny Bernstein
BY
ATTORNEYS

UNITED STATES PATENT OFFICE.

BENNY BERNSTEIN, OF NEW YORK, N. Y., ASSIGNOR OF ONE-FOURTH TO BENNO LOEWY, OF SAME PLACE.

APPARATUS FOR LIGHTING VEHICLES BY ELECTRICITY.

SPECIFICATION forming part of Letters Patent No. 683,432, dated October 1, 1901.

Application filed November 28, 1900. Serial No. 37,970. (No model.)

*To all whom it may concern:*

Be it known that I, BENNY BERNSTEIN, a citizen of the United States, residing in the borough of Manhattan, in the city and State of New York, have invented certain new and useful Improvements in Apparatus for Lighting Vehicles by Electricity, of which the following is a specification.

My invention relates to means hereinafter described, and particularly pointed out in the claims, for transmitting motion from an axle of a railway-car or other vehicle to a dynamo, from which electrical energy is conveyed either directly to suitable electric lamps or to a storage battery from which the current may be supplied to the lamps as required while the vehicle is running or while it is at rest. The rotation of the axle of the vehicle operates the dynamo-shaft through the medium of reciprocating friction-clutches, so devised that constant rotation is imparted to the dynamo in one and the same direction whichever way the axle is running.

Figure 1:
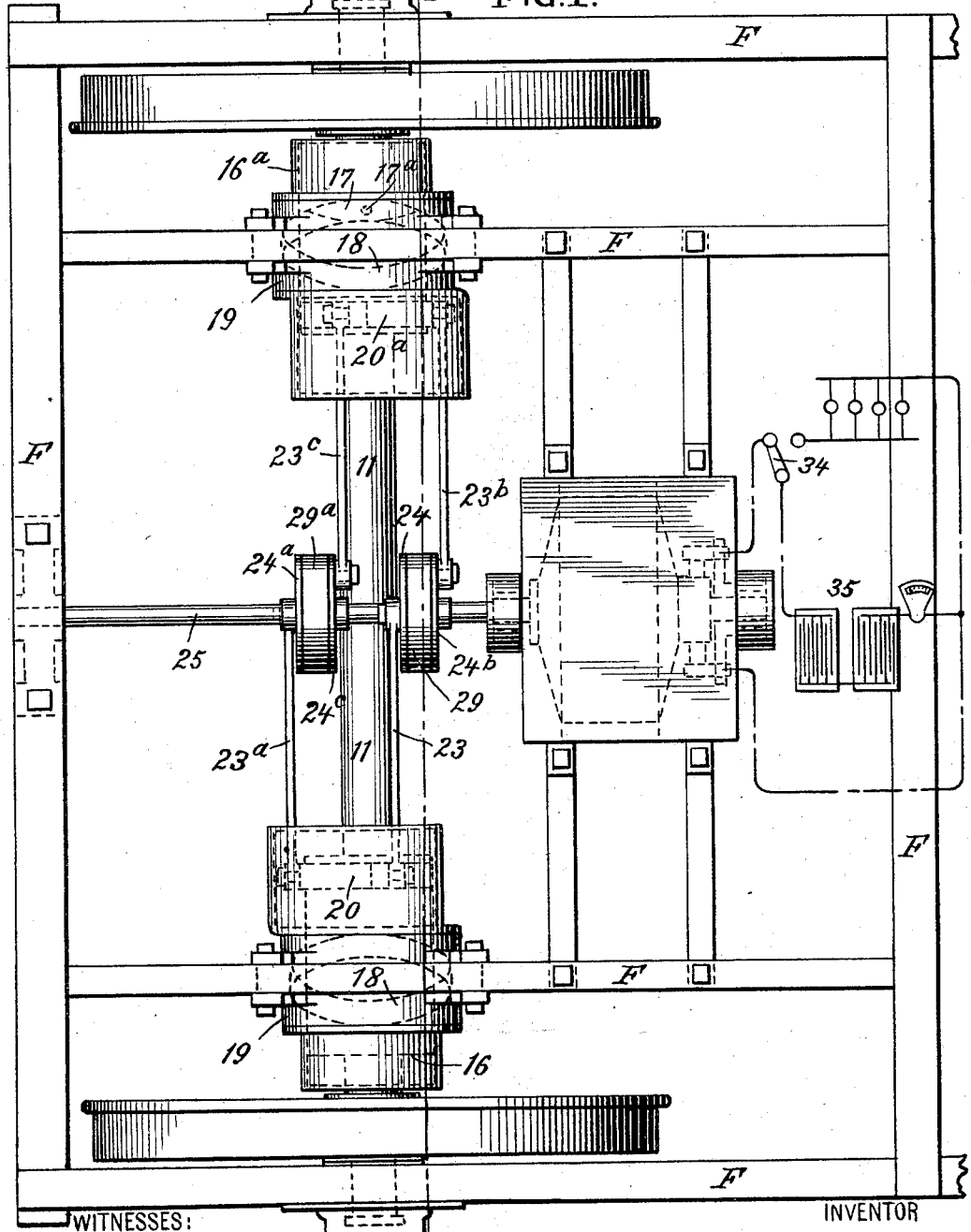
Figure 9:
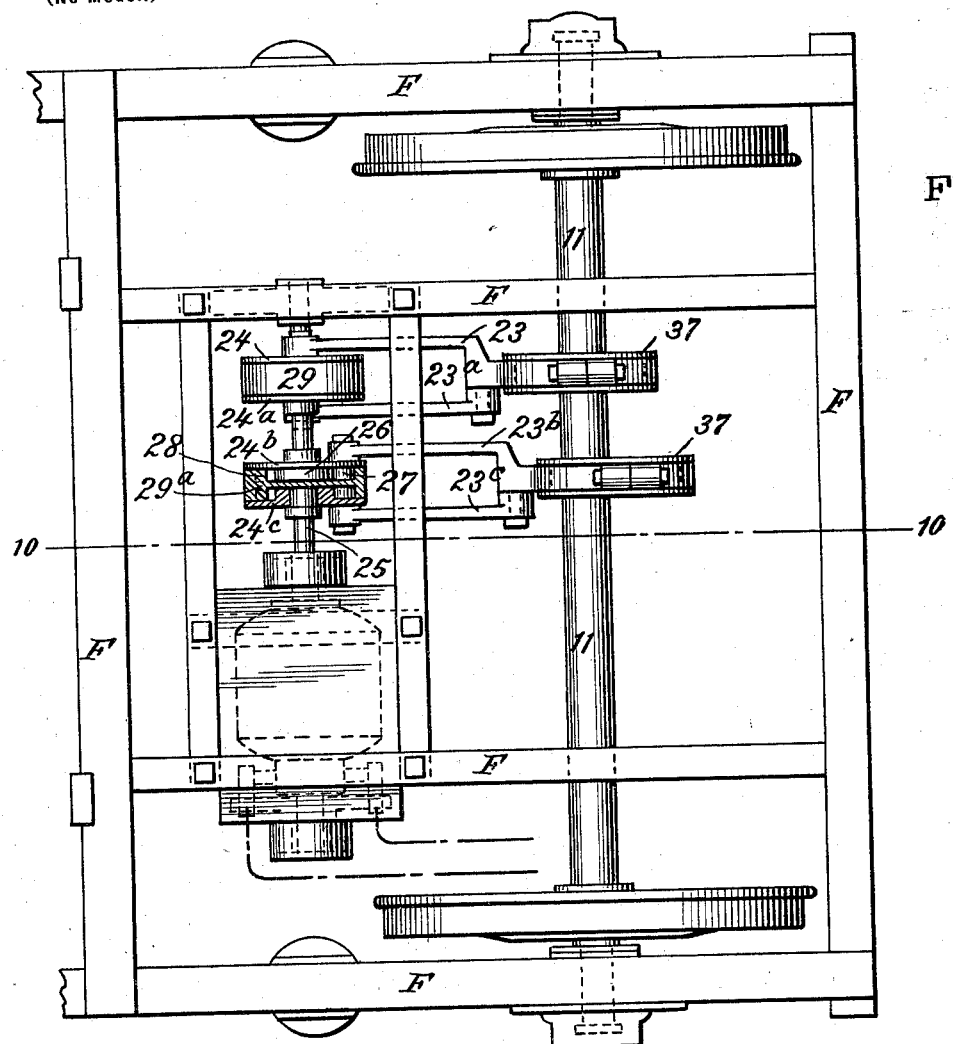
Figure 10:
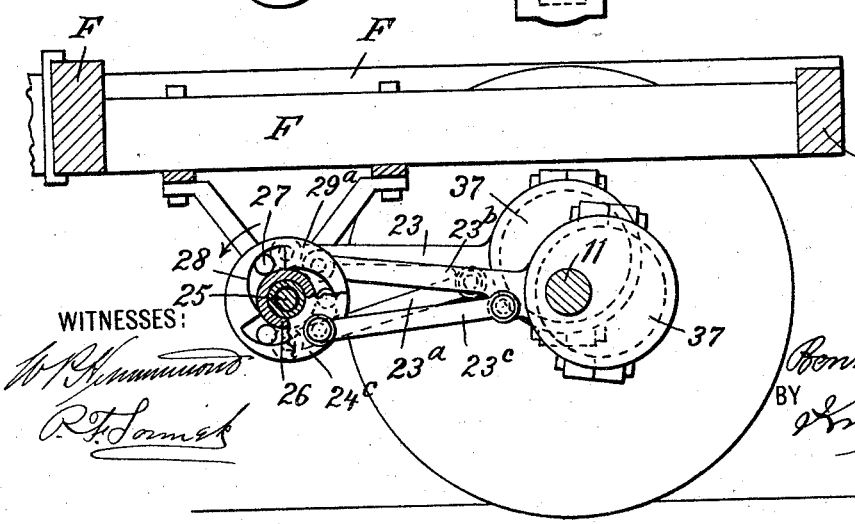

In the accompanying drawings, Figure 1 is a plan view of a car-truck with my invention applied. Fig. 2 is a section on the line 2 2, Fig. 1. Fig. 3 is a perspective view of a rotating cylinder and a cam-traveler carried thereby to impart reciprocating movement to the said cylinder and thence to a friction-clutch by which the armature-shaft is rotated, as hereinafter described. Fig. 3$^a$ is a perspective view of the traveler-guide. Fig. 4 is a section on the line 4 4, Fig. 2. Fig. 5 is a section on the line 5 5, Fig. 2. Fig. 6 is a detail elevation, partly in section, of one of the friction-clutch connections hereinafter described. Fig. 7 is a detail elevation of a modification of a device for operating the friction-clutches. Fig. 8 is a detail illustrating my preferred mode of connecting the operating-rods to the friction-clutches. Fig. 9 is a plan of a truck with my invention applied, illustrating a modification in the device for transmitting motion from the axle to the clutches. Fig. 10 is a section of the same on the line 10 10, Fig. 9.

Referring to Figs. 1 to 5, the car-axle 11, mounted in a truck or car frame F in the usual manner, has secured to it, preferably near either end, by radial arms 13 (to prevent conduction of heat) a cylinder 14, provided on its periphery with longitudinal tongues 15, which fit corresponding grooves on the interior of a second cylinder 16, so as to rotate it while permitting relative longitudinal reciprocating movement of the second cylinder. This longitudinal reciprocating movement is imparted by a traveler 17, pivoted to a stud 17$^a$ on the second cylinder 16 and running in a cam-groove 18, formed in the interior of a fixed casing 19, which is mounted either in the truck or body frame of the car in a manner to secure it against rotary or horizontal movement while permitting slight vertical movement relatively to the axle. The cam-grooves are shown in Fig. 2 and indicated in dotted lines on Fig. 1. The second rotary cylinder 16, which reciprocates endwise, carries a ring 20, which is kept from turning by a lug 21, sliding in guides 22, formed on the fixed casing 19. A connecting-rod 23 is pivoted to the ring 20 and to the upper side of a disk 24, loosely mounted on the armature-shaft 25, which is mounted transversely to the axle 11 in suitable bearings. Another connecting-rod 23$^a$ is pivoted to the ring 20 and to the lower side of another loosely-mounted disk 24$^a$. These disks are each provided with a cylindrical hub 26, forming an interior bearing for clutch balls or rollers 27, Figs. 2, 5, and 6, which ride between the hubs 26 of the disks and cam-surfaces 28, formed on the inside periphery and on both sides or faces of flanged disks 29 29$^a$, secured to the armature-shaft 25. (See Figs. 1 and 5.) The cam-surfaces 28 are all inclined in the same direction, so that when the upper connecting-rod 23 (to the left in Fig. 2) is moved to the left the hub of the loosely-mounted disk 24 will cause the balls or rollers to bite against the cam-surfaces 28 of the disk 29 and rotate the armature-shaft 25, to which it is secured, in the direction indicated by the arrow in Fig. 2. At the same time the lower connecting-rod 23$^a$ (shown in Fig. 1 and in dotted lines in Fig. 2) being moved to the left and rotating the disk 24$^a$ in the opposite direction to the rotation of the disk 24 the hub of the disk 24$^a$ will carry the balls or rollers away from the cam-surfaces of the disk 29$^a$ and run loose without effect on the shaft. When the connecting-rods 23 23ª are moved to the right, the hub of the disk 24ª, which is rotated by the lower rod 23ª, pivoted to its lower side, will force the balls or rollers against the cam-surfaces of the disk 29ª, while the disk 24, rotated in the opposite direction by the upper rod 23, will run free. Another pair of disks 24$^b$ 24$^c$ are applied to the opposite faces of the respective flanged disks 29 29ª, acting on similar clutch balls or rollers and connecting in similar manner by lower and upper connecting-rods 23$^b$ 23$^c$ with a ring 20ª on a second reciprocating cylinder 16ª. (Shown at the right in Fig. 2.)

The travelers 17 of the respective reciprocating cylinders 16 16ª at each end of the axle are so placed in their corresponding grooves in the casings 19 19ª that while one cylinder is at the end of its longitudinal movement the other is at mid-stroke. By this means dead-centers are avoided and constant rotation is imparted to the armature-shaft in one and the same direction whichever way the axle is running.

My preferred mode of pivoting the connecting-rods to their respective disks is illustrated in Fig. 8. In this device the attachment of the respective connecting-rods to the reciprocating clutch-disks 24 24ª is made through the medium of pairs of pivoted bars 38, diverging from their pivot connection with the end of the connecting-rod and extending across the armature-shaft to the opposite side of the disk, to which each is attached by a pin or pivot 39. Instead of the hinged connecting-rods the rings 20 20ª can be provided with rigid arms 30, having slots 31 at their ends for the pins on the disks 24 24ª to ride in, as shown in Fig. 7.

The armature-shaft 25 is provided with roller-bearings 32, as shown in Fig. 4, at each end of the generator, and cushions 33 are provided where the generator and shaft are hung to the truck. As illustrated in Fig. 1, the generator is connected by a switch 34 with the storage-cells 35 for charging them. By turning the switch 34 the lamps 36 can be lighted and the generator-circuit broken, or the switch may be made to make direct connections between the generator and the lamps. By the number of clutch-rollers employed, each being actuated at every revolution of the axle, the speed of rotation imparted to the armature-shaft may be increased or diminished.

The connecting-rods of the loosely-mounted disks 24 24ª, instead of being connected to the rings 20 20ª on reciprocating cylinders, can be connected by yokes 38 to eccentrics 37 37ª upon the axle 11, as shown in Figs. 9 and 10, the eccentrics being placed at right angles to each other, so that when one is at the end of its movement the other is midway. In this illustration I have shown the connecting-rods 23 23ª, which move in unison, pivoted at top and bottom, respectively, to loose disks 24 24ª on opposite faces of the cam-disk 29, so that the said cam-disk will be rotated in one and the same direction by the thrust of one connecting-rod and the draft of the other, as described. In like manner the second eccentric 37ª rotates the cam-disk 29ª through the medium of connecting-rods 23$^b$ and 23$^c$ and loose disks 24$^b$ 24$^c$.

It is manifest that my invention above described is adapted to be operated by the shafts of steam vessels of all kinds, as well as the axles of railway and other cars and carriages of various descriptions.

Having thus described my invention, the following is what I claim as new therein and desire to secure by Letters Patent:

1. In an apparatus for lighting vehicles or the like by electricity, the combination of the armature-shaft 25; flanged clutch-disk 29 keyed thereon having oblique cam-surfaces 28 on its opposite faces; reciprocating disks loosely mounted on the shaft 25 on opposite sides of the clutch-disk 29, having friction-surfaces 26 opposed to the cam-surfaces 28; friction-rollers 27, engaged by the opposed cam-surfaces 26, 28; and connecting-rods pivoted to the respective loose disks, having reciprocating movement imparted from the shaft or axle 11 and imparting continuous rotary movement to the armature-shaft 25, by such reciprocating movement, as explained.

2. In an apparatus for lighting vehicles or the like by electricity; the combination of the armature-shaft 25; a plurality of oblique-faced clutch members 28 keyed on said armature-shaft; separate disks 24, 24ª, loosely mounted on the shaft 25, having friction-surfaces 26, opposed to the respective oblique clutch-surfaces 28; friction-rollers 27 engaged by the opposed cam-surfaces 26, 28; and paired connecting-rods 23, 23ª, pivoted to the disks 24, 24ª, respectively, on opposite sides of the armature-shaft 25, and having a common reciprocating movement imparted from the shaft or axle 11 so as to rotate the clutch members and armature-shaft in the same direction by the forward and back strokes of the said paired connecting-rods, as explained.

3. In an apparatus for lighting vehicles or the like by electricity; the combination of the armature-shaft 25; oblique-faced clutch members 28 fixed to said shaft; reciprocating disks 24, 24$^b$ loosely mounted on the shaft 25 and having annular friction-surfaces 26 opposed to the oblique surfaces of the clutch members 28; friction-rollers 27, engaged by the opposed surfaces 26, 28, when the respective disks are rotated forward; and connecting-rods 23, 23$^b$, pivoted respectively to the loose disks 24, 24$^b$, and means for imparting consecutive reciprocating movement to the connecting-rods 23, 23$^b$, from the rotation of the shaft or axle 11, substantially as and for the purposes set forth.

4. In an apparatus for lighting vehicles and the like by electricity, the combination of the shaft or axle 11 cylinder 14 mounted thereon through the medium of radial arms 13, reciprocating cylinder 16 rotated by the cylinder 14, traveler 17 carried by the cylinder 16, fixed casing 19 having cam-groove 18 in which the traveler 17 runs to impart endwise-reciprocating motion to the rotating cylinder 16, the connecting-rods 23 carried by a guided ring 20 on the rotary cylinder 16, and deriving endwise-reciprocating motion therefrom, friction-clutch mechanism 24, 26, 27, 28, 29, and the armature-shaft 25 rotated by said friction-clutch mechanism, substantially as and for the purposes set forth.

BENNY BERNSTEIN.

Witnesses:
OCTAVIUS KNIGHT,
W. P. HAMMOND.